United States Patent
Krauss et al.

(10) Patent No.: US 8,412,477 B2
(45) Date of Patent: Apr. 2, 2013

(54) METHOD AND ARRANGEMENT FOR DIGITAL MEASURING A CAPACITIVE SENSOR

(75) Inventors: Mathias Krauss, Centerport, NY (US); Gero Roos, Laussnitz (DE)

(73) Assignee: Zentrum Mikroelektronik Dresden AG, Dresden (DE)

( * ) Notice: Subject to any disclaimer, the term of this patent is extended or adjusted under 35 U.S.C. 154(b) by 189 days.

(21) Appl. No.: 12/963,437

(22) Filed: Dec. 8, 2010

(65) Prior Publication Data

US 2011/0137593 A1      Jun. 9, 2011

Related U.S. Application Data

(60) Provisional application No. 61/267,661, filed on Dec. 8, 2009.

(51) Int. Cl.
  *G01R 25/00* (2006.01)
  *G01R 31/08* (2006.01)
  *H03M 1/12* (2006.01)

(52) U.S. Cl. ............. 702/65; 324/519; 341/172

(58) Field of Classification Search ........ 702/65, 702/64, 57, 72, 75, 78, 81, 84, 127, 179, 702/182–183, 189; 307/100, 108–110, 112–113, 307/115–116, 125; 320/137, 139, 141–142, 320/145; 324/76.39, 76.41, 76.47, 76.52, 324/76.77, 76.82, 519–522, 548, 658, 686; 341/155, 172

See application file for complete search history.

(56) References Cited

U.S. PATENT DOCUMENTS

| | | | |
|---|---|---|---|
| 4,971,015 | A | 11/1990 | Gonze |
| 5,990,578 | A | 11/1999 | Krauss |
| 2004/0004487 | A1 | 1/2004 | Vanzuilen et al. |
| 2004/0251919 | A1 | 12/2004 | Stahlmann et al. |
| 2008/0191713 | A1* | 8/2008 | Hauer et al. ......... 324/658 |

FOREIGN PATENT DOCUMENTS

| | | |
|---|---|---|
| DE | 19917618 B4 | 4/2004 |
| WO | 2009030743 A2 | 3/2009 |

OTHER PUBLICATIONS

Yamada et al., A Switched-Capacitor Interface for Capacitive Pressure Sensors, Feb. 1992, IEEE Transactions on Instrumentation and Measurement, vol. 41, No. 1, pp. 81-86.*
Matsumoto et al., A Switched-Capacitor Charge-Balancing Analog-to-Digital Converter and Its Application to Capacitance Measurement, Dec. 1987, IEEE Transactions on Intrumentation and Measurement, vol. IM-36, No. 4, pp. 873-878.*

* cited by examiner

*Primary Examiner* — Toan Le
(74) *Attorney, Agent, or Firm* — Heslin Rothenberg Farley & Mesiti P.C.

(57) ABSTRACT

An arrangement for digital measuring a capacitive sensor is provided with a charge balance frequency converter having an operational amplifier with an inverting input, a noninverting input and an output. Between the output and the inverting input an integrating capacitor is connected, and the noninverting input is connected with a reference potential. The arrangement provides a simple switched capacitor architecture for measuring the sensor capacitance, which tolerates grounded sensor capacitors, and which is not affected by the shunt resistance. The value of the shunt resistance is determined at the same time. The arrangement makes use of a two frequency measurement of the capacitor resistance combination by using the charge balancing procedure followed by a calculation based on the results of two conversions and the ratio of the clock frequencies of the first and second conversion.

8 Claims, 4 Drawing Sheets

METHOD AND ARRANGEMENT FOR DIGITAL MEASURING A CAPACITIVE SENSOR

CROSS-REFERENCE TO RELATED APPLICATIONS

This application claims priority of provisional application No. 61/267,661, filed Dec. 8, 2009, the entire of contents of which is hereby incorporated by reference herein.

BACKGROUND OF THE INVENTION

The present invention relates to a method for digital measuring a capacitive sensor. The invention relates also to an arrangement for digital measuring a capacitive sensor. The arrangement is provided with a charge balance frequency converter having an operational amplifier with an inverting input, a noninverting input and an output. Between the output and the inverting input an integrating capacitor is connected and the noninverting input is connected with a reference potential.

In more detail, the invention concerns a capacitance measurement of a capacitive sensor, which is applicable to the determination of the dielectric constant of a liquid, in order to determine the characteristics of the liquid, and concerns a procedure, which allows to compensate the disturbing conductivity during the measurement of the capacitance and to determine the conductivity parameters beyond that quantitatively. Typical application areas of the invention are the determination of the alcohol content in the fuel mixture of combustion engines or the determination of the quality and the level in storage vessels of liquids.

For the direct conversion of the capacitance of the capacitive sensor to a digital value the Switched—Capacitor (sc) technique offers very robust solutions. Well-known A to D conversion techniques, like the sigma delta or the charge balancing procedure have been modified by replacing one of the capacitors of the sc network with the sensor capacitor. When an unknown capacitor and a known reference capacitor charge and discharge an integrating capacitor respectively controlled by a feedback loop, so that the overall net-charge is balanced to be zero, the value of the unknown capacitor can be determined as a digital number by counting the number of discharge events This is disclosed in U.S. Pat. No. 5,990,578.

Compared to other common methods of measuring capacitive sensors like C-f-conversion with following f-V-conversion and AD-conversion or the AC-based measurement of impedance, a direct capacity to digital conversion simplifies the sensor readout circuit substantially.

A very fortunate design is possible if the sensor is a two terminal floating capacitor because the measurement can be made insensitive against parasitic capacitances to ground as disclosed in U.S. Pat. No. 5,990,578. However, it is also feasible to use a grounded sensor capacitor in a switched capacitor design.

Usually switched capacitor networks do not allow for resistive components because any continuous current causes errors. The network equations are based on the presumption that all node voltages come to a complete settling during one half of each clock cycle.

For that reason the measurement of capacitive sensors, which include shunt resistors, e.g. capacitive liquid level sensors, is usually based on an ac measurement of magnitude and phase or on resonance circuits as shown in DE 199 17 618 B4. Those circuits include the synthesis of sinusoidal waveforms, precise synchronous demodulation and a-to-d conversion or inductors in case of the resonance method.

As shown in U.S. Pat. No. 4,971,015, another approach, to select the measuring frequency high enough that the resistive portion can be neglected does not satisfy the demand for a wide capacitance and conductance range. In numerous publications a number of relaxation oscillators are used to determine the resistive portion and compensate its influence. This is disclosed in US 2004/0251919 A1 and in US 2004/0004487. An empirical approach is usually required in order to get satisfying results with that method.

In WO 2009/030743 a sc-based technology is described, where the current caused by the shunt resistance is compensated by means of a controlled current source. In that case a sc amplifier establishes an analog output voltage in a single clock cycle, which is digitized thereafter by an AD-converter. In order to guarantee the correct value for the compensation current, in a separate regulation loop the voltage change over the measuring capacity during the sample is used as control signal. Altogether this method is relative complex and likewise not very robust against disturbances. A substantial disadvantage is also that only a floating sensor capacitor can be used.

SUMMARY OF THE INVENTION

It is an object of the invention to provide a circuit and a method which uses the simple switched capacitor architecture for measuring the sensor capacitance, which tolerates grounded sensor capacitors, which is not affected by the shunt resistance. It is another object of the invention also to determine the value of the shunt resistance at the same time.

The present invention makes use of a two frequency measurement of the capacitor resistance combination by using the charge balancing procedure followed by a calculation based on the results of the two conversions and the ratio of the clock frequencies of the first and second conversion. Further also according to the invention the value of the shunt resistor can be determined, if the absolute value of the clock frequency is defined. The procedure according to the invention is based on a circuit, where the discharge effect caused by the shunt resistor reflects itself as virtual enlargement of the sensor capacitance in the conversion result, whose influence can be compensated by the conversion at two different frequencies and appropriate calculation.

BRIEF DESCRIPTION OF THE DRAWINGS

An example of the present invention is described below in greater detail with reference to the associated drawings, wherein.

DETAILED DESCRIPTION OF THE INVENTION

Figure 1:
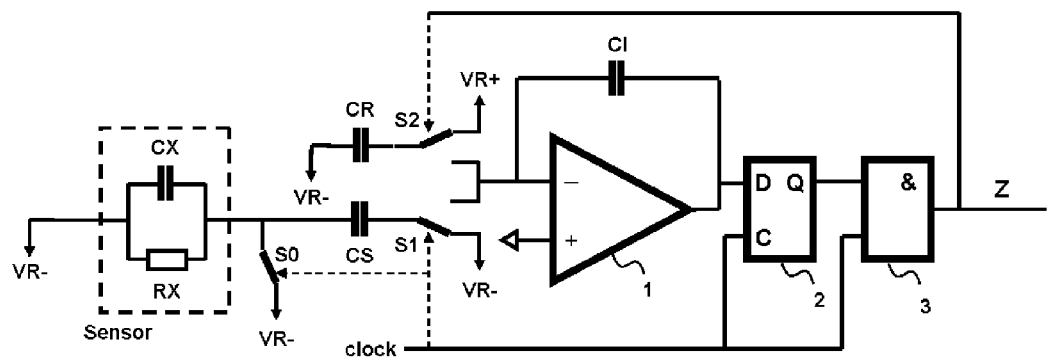
FIG. 1 shows a circuit arrangement of a first embodiment of the present invention.
Figure 2:
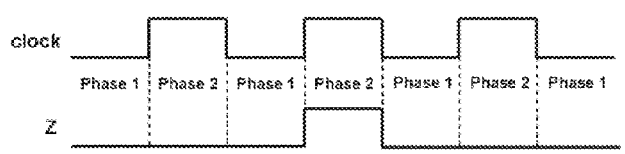
FIG. 2 shows a variant of the switch control of the circuit arrangement.
Figure 3:
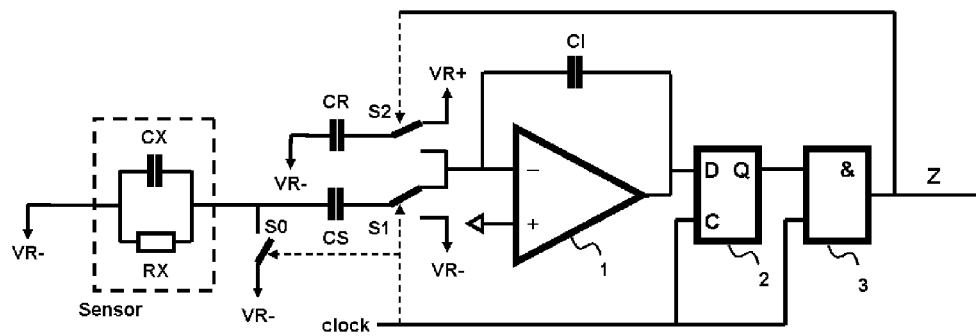
FIG. 3 shows the circuit arrangement in phase 2 of the present invention.
Figure 4:
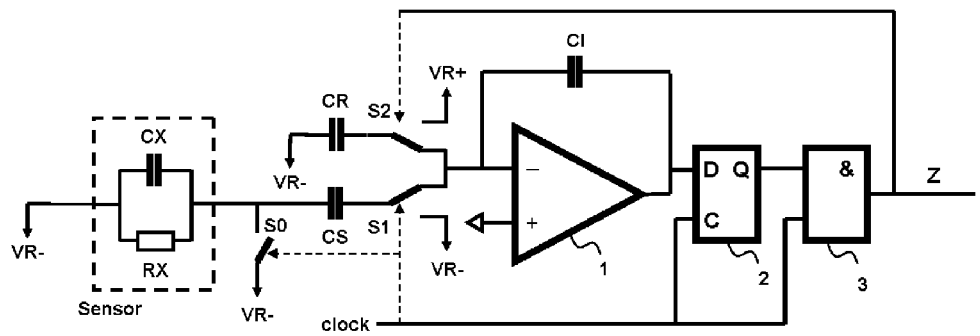
FIG. 4 shows the circuit arrangement in phase 2 of the present invention with a switched reference capacitor.
Figure 5:
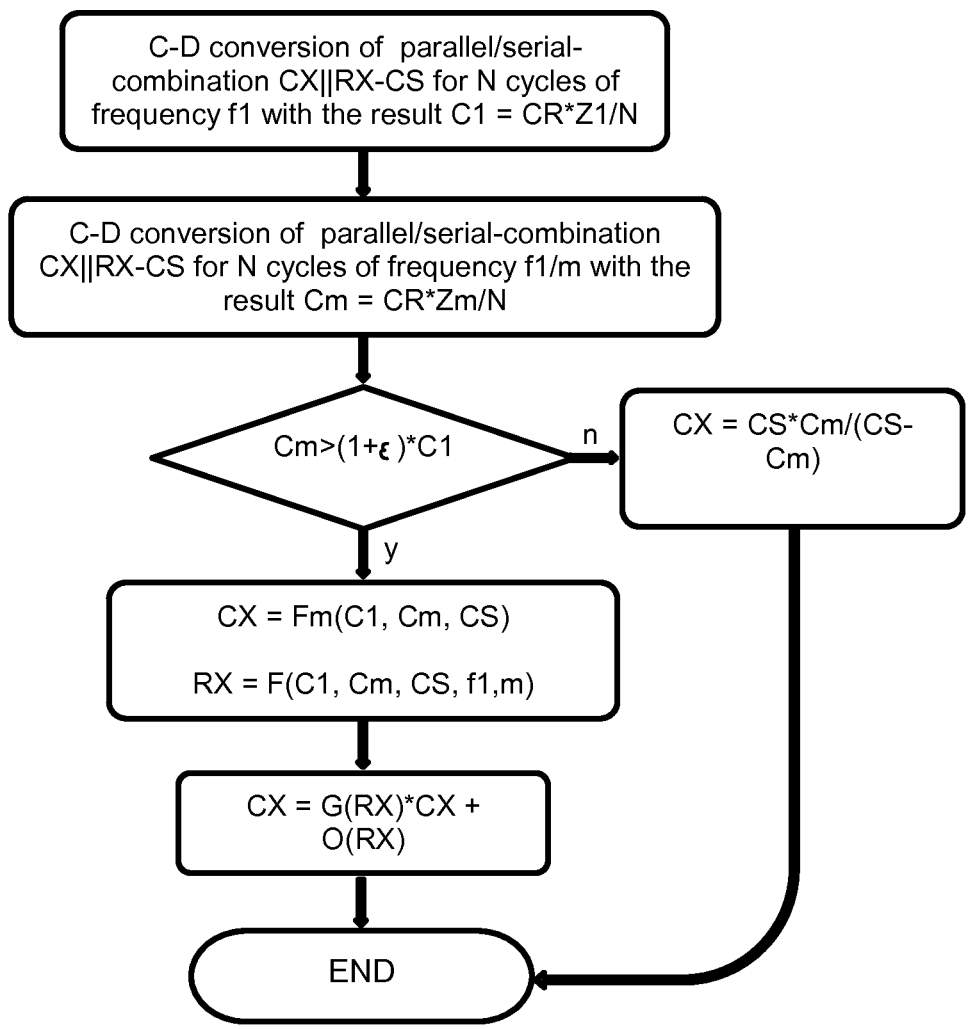
FIG. 5 shows a flow chart of the inventive steps with a general calculation of CX and RX and FIG. 6 shows a flow chart of the invention steps with a detailed calculation of CX and RX.

The circuit according to the invention, its function and the procedure of the computation are described referring to the circuit diagram in FIG. 1, FIGS. 3 and 4, the clock diagram in FIG. 2 and the flow chart in FIG. 5.

The circuit consists of an operational amplifier 1 with an integration capacitor CI connected between its output and inverting input. The output is further connected to the input of a clocked comparator or a D-Flip-flop 2, which controls a gate circuit 3.

At the output of the gate circuit 3 the gated clock pulses Z represent the conversion result. At the input two switched capacitors CR and CS are arranged. The reference capacitor CR is connected on one side with the negative reference voltage and on the other side with the switch S2, which, controlled by the pulse rate Z, connects CR either with the positive reference voltage or with the inverting input of the amplifier. One side of the capacitor CS is connected with the switch S1, which, controlled by the clock, connects CS either with the inverting integrator input or with the negative reference voltage. The other side of CS is connected with the capacitive sensor and with the switch S0, which, controlled by the clock, connects the interconnect point CS-sensor with the negative reference voltage. The second side of the capacitive sensor is connected with the negative reference voltage. The positive input of the operational amplifier 1 is connected to the analog ground potential, which lies accurately in the center between positive and negative reference voltage. In the simplest case the negative reference voltage is zero, the positive reference voltage is VDD and the analog reference potential equals VDD/2.

The clock diagram in FIG. 2 shows one of the possible variants of the switch control. The clock has a duty cycle of accurately 0.5. During phase 1 all switches are in the position indicated in FIG. 1. The sensor capacity and CS are discharged, capacitor CR is charged to the voltage VR+.

As shown in FIG. 3, during phase 2 CS is connected by the switch S1 to the inverting integrator input as well as the switch S0 is opened. The parallel/series combination CX//RX—CS withdraws instantly a charge quantity of $0.5*(VR+-VR-)*CX*CS/(CX+CS)$ and in the further process of phase 2 additional charge is continuously withdrawn caused by the influence of the shunt resistor RX. Due to this charge withdrawal the output voltage of the integrator rises.

If the output voltage exceeds the trigger point of the comparator 2 the following clock pulse appears at the counting pulse output and controls via the switch S2 the addition of a charge package of the quantity $0.5*(VR+-VR-)*CR$. This is shown in FIG. 4.

Over a sufficient large number of clock pulses a charge balance establishes and the ratio of the number of Z-pulses versus the total number of clock pulses multiplied by the reference capacity represents the virtual capacity C1 of the parallel/series combination CX//RX—CS. This size is due to the continuous load withdrawal during the phase 2, caused by the resistance RX, dependent on the length of the phase 2 and of the clock frequency.

As in the flow chart FIG. 5 shown, a second conversion takes place following the same clock pattern with a frequency film, where m=2, m=3 or m=4. The result Cm of this conversion is compared with the result C1 of the preceding conversion. In case those two results are almost equal this indicates a very large shunt resistance or the absence of a shunt resistance. If the value of C1 is smaller than Cm the value of CX is calculated as a function Fm of C1, Cm and CS. Cm>C1 is compared in consideration of a sensitive range $\xi C1$, i.e. Cm is considered only greater than C1 (the yes path in FIG. 5) if C1 is greater $C1+\xi C1$.

Depending on the value m the solution of a linear (m=2), a second order (m=3) or a cubic (m=4) equation is necessary. In a further calculation step the resistance value RX can be calculated as a logarithmic function of C1, Cm, CS and the frequency f1 as well as the divider factor m.

Figure 6:
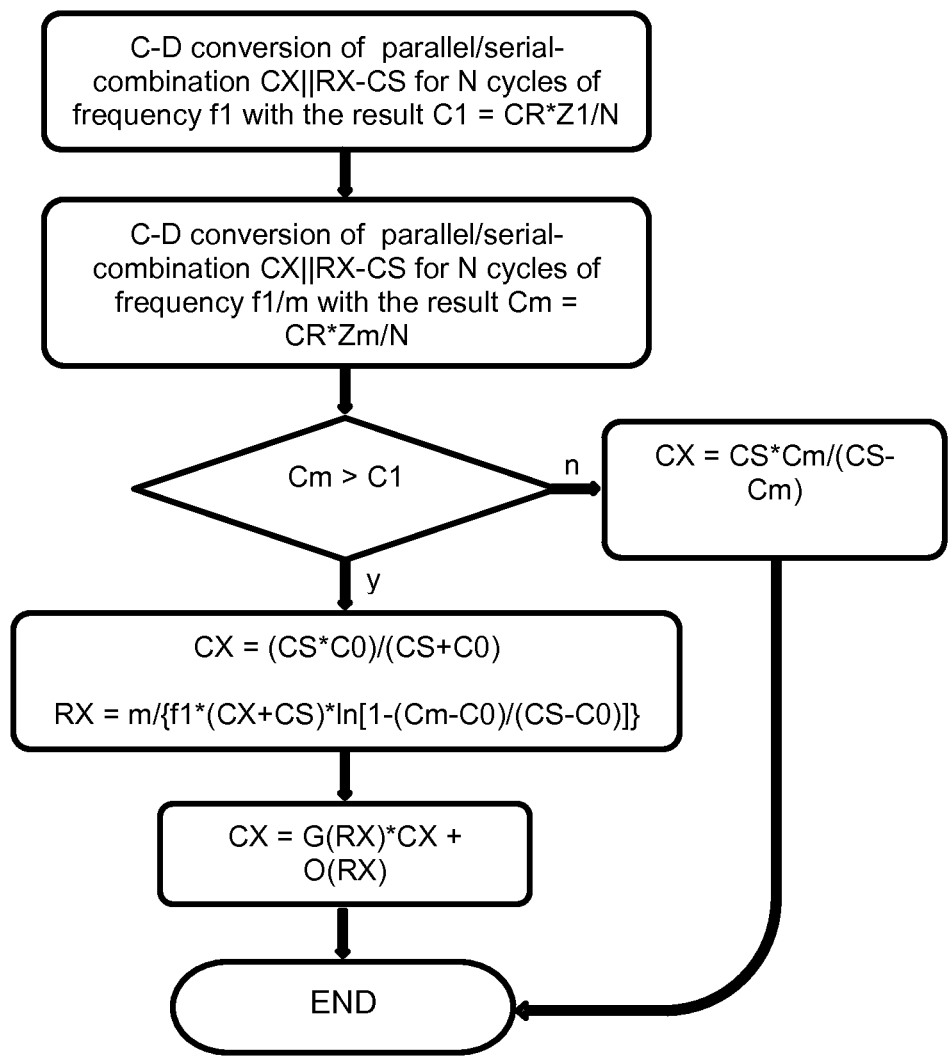

A favorable implementation is shown in FIG. 6. In case those two results are almost equal this indicates a very large shunt resistance or the absence of a shunt resistance. If the value of C1 is smaller than Cm the value of CX is calculated as $CX=CS*C0/(CS+C0)$.

Depending on the value m the solution of a linear (m=2), a second order (m=3) or a cubic (m=4) equation is necessary to calculate C0. This equation derives from $(1-(C1-C0)/(CS-C0))m=1-(Cm-C0)/(CS-C0)$.

In a further calculation step the resistance value RX can be calculated as $RX=m/\{f1*(CX+CS)*\ln[1-(Cm-C0)/(CS-C0)]\}$ This implementation implifies the calculation and also reduces errors caused by component tolerances, is given with CS=CR. Depending on the implementation, it can be of advantage to perform afterwards a signal conditioning of the value of CX by means of a gain and offset correction in order to increase the accuracy over a wide range of RX and CX.

The invention claimed is:

1. A method for digital measuring a capacitive sensor CX using a charge balancing procedure comprising the steps:
    a. first converting, with a charge balance frequency converter, a value of the capacitance of the capacitive sensor into a number Z1 of pulses with a first clock frequency f1;
    b. second converting, with the charge balance frequency converter, the value of the capacitance of the capacitive sensor into a number Zm of pulses with a second clock frequency fm;
    c. comparing results of the first converting and the second converting;
    d. calculating a real capacitance and a value of a shunt resistance of the capacitive sensor with a function depending on the first and the second converting results if the results are not equal; and
    e. calculating the real capacitance of the capacitive sensor with a function depending on the result of the second converting if the results are equal.

2. The method of claim 1, comprising the steps of:
    a. first converting of parallel/serial-combination CX∥RX–CS for N cycles of frequency f1 with a shunt resistor Rx and an input capacitor CS;
    b. calculating a virtual capacity C1 with a result C1=CR*Z1/N, wherein CR comprises a reference capacitor;
    c. second converting of parallel/serial-combination CX∥RX-CS for N cycles of frequency f1/m, wherein divider factor m=2, 3 or 4;
    d. calculating a virtual capacity Cm with a result Cm=CR*Zm/N;
    e. comparing the results of C1 with Cm;
    f. calculating the real capacitance CX of the capacitive sensor with a result CX=function Fm(C1, Cm, CS) if Cm>C1;
    g. calculating the real capacitance CX of the capacitive sensor with a function CX=CS*Cm/(CS-Cm) if not Cm>C1.

3. The method of claim 2, wherein the real capacitance CX of the capacitive sensor is calculated with a function CX=(CS*C0)/(CS+C0) if Cm>C1, wherein C0 results from the equation $$(1-(C1-C0)/(CS-C0))m=1-(Cm-C0)/(CS-C0).$$

4. The method of claim 2, wherein the value of the shunt Resistor RX is calculated as $RX=F(C1, Cm, CS, f1, m)$.

5. The method of claim 4, wherein RX is calculated by $RX=m/\{f1*(CX+CS)*\ln[1-(Cm-C0)/(CS-C0)]\}$.

6. The method of claim 2, wherein Cm is considered greater than C1 only if Cm is greater than $C1+\xi C1$, with a sensitive range $\xi C1$.

7. The method of claim 2, wherein a gain correction value G(RX) and an offset correction value O(RX) are determined in a calibration step previous to the first converting and the real capacitance CX is finally calculated as $CX=G(RX)*CX+O(RX)$.

8. Arrangement for Digital Measuring a Capacitive Sensor comprising:
   a. an operational amplifier with an integration capacitor CI connected between an output and an inverting input of the amplifier, the output is further connected to an input of a clocked comparator, which controls a gate circuit and a positive input of the operational amplifier is connected to an analog ground potential;
   b. two switched capacitors CR and CS, wherein
      i. capacitor CR is connected on one side with a negative reference voltage and on the other side with a switch S2, which, controlled by a pulse rate Z, connects capacitor CR either with a positive reference voltage or with the inverting input of the amplifier,
      ii. capacitor CS is connected on one side with a switch S1, which, controlled by a clock, connects capacitor CS either with the inverting input or with a negative reference voltage, the other side of capacitor CS is connected with the capacitive sensor and with a switch S0, which, controlled by the clock, connects an interconnect point of capacitive sensor either with the negative reference voltage or capacitor CS, and the second side of the capacitive sensor is connected with the negative reference voltage; and
   c. wherein a real capacitance and the value of a shunt resistor of the capacitive sensor are calculated based upon gated clock pulses output by the gated circuit at a first clock frequency and a second clock frequency, respectively.

* * * * *